US012065129B2

(12) United States Patent
Kitagawa et al.

(10) Patent No.: US 12,065,129 B2
(45) Date of Patent: Aug. 20, 2024

(54) CONTROLLER OF HYBRID SYSTEM

(71) Applicant: TOYOTA JIDOSHA KABUSHIKI KAISHA, Aichi-ken (JP)

(72) Inventors: Kensuke Kitagawa, Toyota (JP); Yasuyuki Terada, Toyota (JP); Makio Tsuchiyama, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 277 days.

(21) Appl. No.: 17/694,681

(22) Filed: Mar. 15, 2022

(65) Prior Publication Data
US 2022/0297670 A1 Sep. 22, 2022

(30) Foreign Application Priority Data

Mar. 22, 2021 (JP) ................. 2021-047906

(51) Int. Cl.
*B60W 20/50* (2016.01)
*B60W 10/06* (2006.01)
*B60W 10/08* (2006.01)

(52) U.S. Cl.
CPC ............ *B60W 20/50* (2013.01); *B60W 10/06* (2013.01); *B60W 10/08* (2013.01); *B60W 2510/0642* (2013.01); *B60W 2510/081* (2013.01); *B60W 2520/10* (2013.01); *B60W 2710/06* (2013.01); *B60W 2710/08* (2013.01)

(58) Field of Classification Search
CPC ...... B60W 20/50; B60W 10/06; B60W 10/08; B60W 2510/0642; B60W 2510/081
See application file for complete search history.

(56) References Cited

U.S. PATENT DOCUMENTS

| 2004/0153235 A1* | 8/2004 | Kataoka ................. B60L 50/16 701/112 |
| 2005/0093494 A1* | 5/2005 | Nagayama .............. B60L 50/15 180/65.245 |
| 2018/0094722 A1* | 4/2018 | Katakura ................ F16H 59/14 |
| 2018/0135583 A1* | 5/2018 | Mizuno ................... F02N 11/00 |
| 2018/0174374 A1* | 6/2018 | Choi ....................... F16H 57/01 |

FOREIGN PATENT DOCUMENTS

| JP | 2004308496 A | 11/2004 |
| JP | 2016-102436 A | 6/2016 |
| JP | 2016196819 A | 11/2016 |
| JP | 2018-115644 A | 7/2018 |

* cited by examiner

*Primary Examiner* — Jelani A Smith
*Assistant Examiner* — Toya Pettiegrew
(74) *Attorney, Agent, or Firm* — HAUPTMAN HAM, LLP

(57) ABSTRACT

A controller of a hybrid system including an internal combustion engine and a motor generator connected to each other via a belt includes processing circuitry configured to execute a power generation process that applies a load to the engine by controlling the motor generator to generate power when a first execution condition of an idling stop is satisfied, a slip rate calculation process that calculates a slip rate of the belt based on a rotational speed of the engine and a rotational speed of the motor generator while the power generation process is being executed, a determination process that determines whether or not a second execution condition of the idling stop is satisfied after waiting until a predetermined period elapses, when the slip rate is equal to or more than a threshold, and an idling stop process, when determining that the second execution condition is satisfied.

12 Claims, 4 Drawing Sheets

CONTROLLER OF HYBRID SYSTEM

RELATED APPLICATION

The present application claims priority of Japanese Patent Application Number 2021-047906 filed on Mar. 22, 2021, which is hereby incorporated by reference herein in its entirety.

BACKGROUND

1. Field

The following description relates to a controller of a hybrid system.

2. Description of Related Art

Japanese Laid-Open Patent Publication No. 2016-196819 discloses a controller that controls a hybrid system including an engine and a motor generator connected to each other via a belt. The belt is hung on the crank pulley of the engine and the motor generator pulley of the motor generator. Therefore, the crank pulley and the motor generator pulley can rotate in conjunction with each other.

When an idling stop condition is satisfied, the controller executes an idling stop process to stop the operation of the engine. Next, when an engine restart condition is satisfied, the controller executes a restart process in which the crank pulley is rotated by the motor generator to restart the engine.

Here, if the belt slips, restarting the engine may not be possible.

The above controller determines whether or not the belt slips after the restart process is started. The above controller determines that a belt slip has occurred when the value obtained by multiplying the motor generator rotational speed by a pulley ratio deviates from the engine rotational speed. The pulley ratio is a value obtained by dividing the diameter of the motor generator pulley by the diameter of the crank pulley.

When the controller determines that the belt has not slipped, the controller continues the restart process to restart the engine using the motor generator.

When the above controller determines that the belt is slipping, the controller drives the crankshaft using a device other than the motor generator to restart the engine. The device other than the motor generator is, for example, a starter. When the above controller determines that the belt is slipping, it prohibits the subsequent idling stop process and notifies the user of the belt abnormality. As a result, it is possible to prevent a situation where it is apparent that the restart of the engine fails.

When the above controller determines that the belt is slipping, the controller prohibits the subsequent idling stop process. That is, the above controller cannot execute the subsequent idling stop process regardless of whether the belt slip is temporary or not. In such a case, fuel efficiency deteriorates.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a controller of a hybrid system including an internal combustion engine and a motor generator connected to each other via a belt is provided. The controller includes processing circuitry configured to execute a power generation process that applies a load to the internal combustion engine by controlling the motor generator to generate power when a first execution condition of an idling stop is satisfied, a slip rate calculation process that calculates a slip rate of the belt based on a rotational speed of the internal combustion engine and a rotational speed of the motor generator while the power generation process is being executed, a determination process that determines whether or not a second execution condition of the idling stop is satisfied after waiting until a predetermined period elapses, when the slip rate is equal to or more than a threshold, and that determines whether or not the second execution condition of the idling stop is satisfied without waiting, when the slip rate is less than the threshold, and an idling stop process that stops an operation of the internal combustion engine, when the determination process determines that the second execution condition of the idling stop is satisfied.

In another general aspect, a controller of a hybrid system including an internal combustion engine and a motor generator connected to each other via a belt is provided. The controller includes processing circuitry configured to execute a power generation process that applies a load to the internal combustion engine by controlling the motor generator to generate power when a first execution condition of an idling stop is satisfied, a slip rate calculation process that calculates a slip rate of the belt based on a rotational speed of the internal combustion engine and a rotational speed of the motor generator while the power generation process is being executed, a repeat process that repeats the power generation process and the slip rate calculation process after waiting until a predetermined period elapses, when the slip rate is equal to or more than a threshold, a determination process that determines whether or not a second execution condition of the idling stop is satisfied without waiting, when the slip rate is less than the threshold, and an idling stop process that stops an operation of the internal combustion engine, when the determination process determines that the second execution condition of the idling stop is satisfied.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described.

Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

First Embodiment

Hereinafter, a controller 34, which is a controller of a hybrid system according to the first embodiment, will be described with reference to the drawings.
<Vehicle Configuration>

Figure 1:
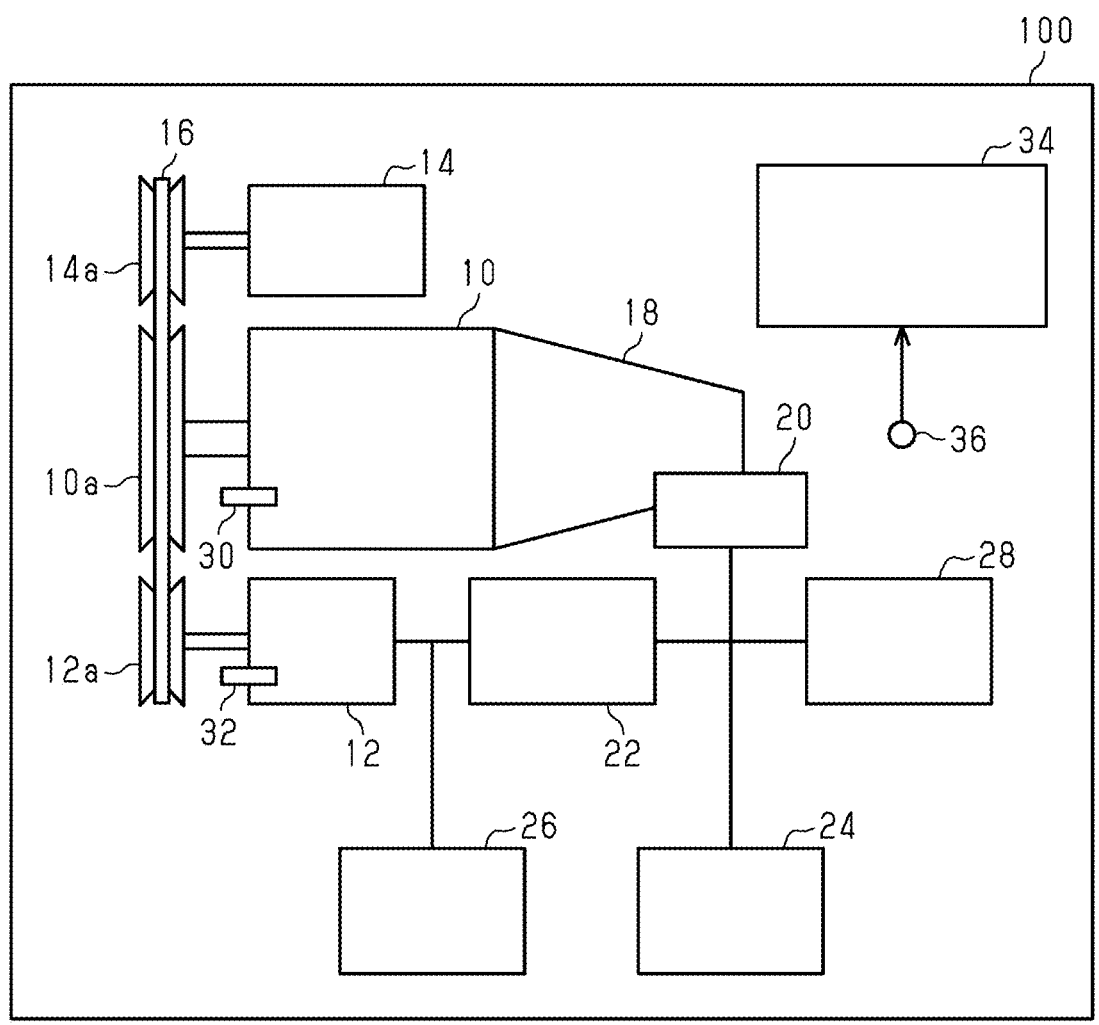
FIG. 1 is a schematic diagram showing a controller according to a first embodiment and a vehicle including a hybrid system to be controlled by the controller.

As shown in FIG. 1, a vehicle 100 includes a hybrid system that is the control target of the controller 34 according to the first embodiment. The controller 34 is installed in the vehicle 100. The hybrid system includes an internal combustion engine (hereinafter, an engine) 10 and a motor generator 12. An air conditioning compressor (hereinafter referred to as an AC compressor) 14 is installed in the vehicle 100. The engine 10 has a crank pulley 10*a*. The motor generator 12 has a motor generator pulley 12*a*. The AC compressor 14 has an AC compressor pulley 14*a*. The crank pulley 10*a*, the motor generator pulley 12*a*, and the AC compressor pulley 14*a* are connected to each other via a belt 16.

In this way, in the hybrid system mounted on the vehicle 100, the engine 10 and the motor generator 12 are connected to each other via the belt 16. The controller 34 controls such a hybrid system.

In addition, the vehicle 100 is equipped with a transmission 18, a starter 20, a DC-DC converter 22, an auxiliary device 24, a 48V battery 26, and a 12V battery 28. The 48V battery 26 is, for example, a Li-ion battery. The 12V battery 28 is, for example, a lead battery. The transmission 18 is connected to the engine 10. The starter 20 is connected to the transmission 18. The starter 20 can drive the transmission 18. The engine 10 can be started by driving the transmission 18 with the starter 20. The 48V battery 26 is connected to the motor generator 12 and the DC-DC converter 22. The 12V battery 28 is connected to the starter 20, the DC-DC converter 22, and the auxiliary device 24.

The controller 34 includes a so-called microcomputer having a Central Processing Unit (CPU), Read only memory (ROM), Random access memory (RAM), an input/output interface, and the like. The controller 34 performs signal processing according to a program stored in advance in the ROM while using the temporary storage function of the RAM. The controller 34 can control the engine 10, the motor generator 12, and the like.

An engine rotational speed sensor 30 is provided on the engine 10. The controller 34 can acquire the rotational speed of the engine 10 through the engine rotational speed sensor 30. A motor generator rotational speed sensor 32 is provided on the motor generator 12. The controller 34 can acquire the rotational speed of the motor generator 12 through the motor generator rotational speed sensor 32. In addition, the controller 34 can acquire the speed of the vehicle 100 through a vehicle speed sensor 36.

<Process Executed by Controller>

Figure 2:
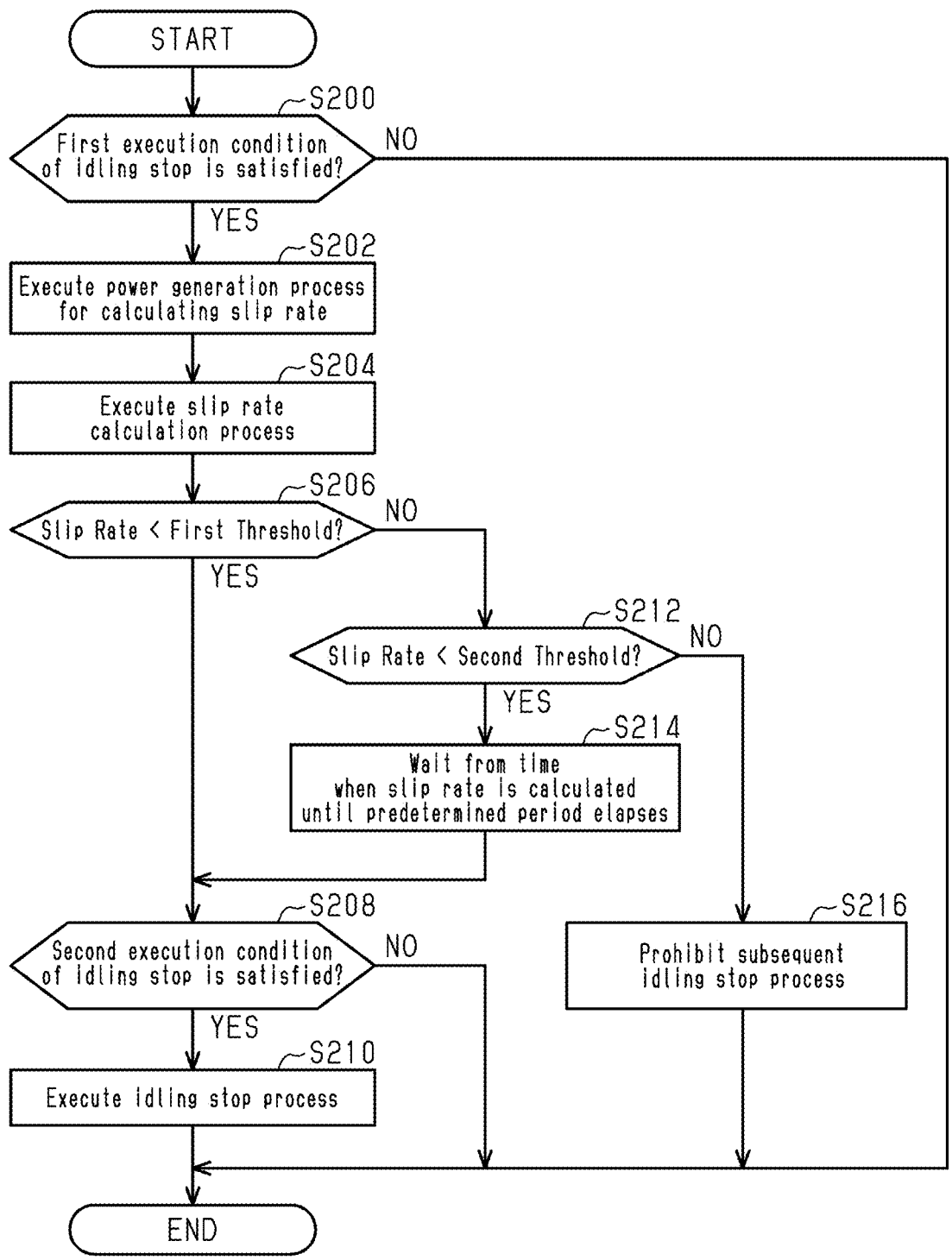
FIG. 2 is a flowchart of processing executed by the controller according to the first embodiment.

FIG. 2 is a flowchart of processing executed by the controller 34 according to the first embodiment. The processing of FIG. 2 is executed at a predetermined cycle during the operation of the vehicle 100.

The controller 34 determines whether or not a first execution condition of an idling stop is satisfied in S200. For example, the first execution condition includes a condition that a speed of the vehicle 100 on which the hybrid system is mounted is equal to or less than a first speed. The first execution condition of the idling stop being satisfied means a state where execution of an idling stop process should be expected. When the controller 34 determines that the first execution condition of the idling stop is not satisfied (S200: No), the controller 34 ends this flow. When the controller 34 determines that the first execution condition of the idling stop is satisfied (S200: Yes), the controller 34 proceeds to S202.

The controller 34 executes a power generation process for calculating a slip rate in S202. Specifically, combustion is executed in the engine 10, and the energy generated by the combustion is transmitted to the motor generator 12 via the crank pulley 10*a*, the belt 16, and the motor generator pulley 12*a*. At the same time, the controller 34 applies a load to the engine 10 via the belt 16 by controlling the motor generator 12 to generate power. As a result, the belt 16 is more likely to slip than when the power generation process is not executed. Similarly, when the motor generator 12 restarts the engine 10 via the belt 16, the belt 16 is likely to slip. As will be described later, the controller 34 calculate the slip rate under the condition that the load is applied to the engine 10 by executing the power generation process. Therefore, the slip rate can be appropriately calculated as a value for evaluating a degree to which a failure of restarting the engine 10 by the motor generator 12 can be suppressed.

According to S200 and S202, the controller 34 executes a power generation process that applies a load to the engine 10 by controlling the motor generator 12 to generate power when a first execution condition of an idling stop is satisfied.

The controller 34 starts executing the power generation process in S202. The controller 34 then executes a slip rate calculation process in S204. First, the controller 34 acquires the rotational speed of the engine 10 and the rotational speed of the motor generator 12. The controller 34 then calculates the slip rate of the belt 16 based on the rotational speed of the engine 10 and the rotational speed of the motor generator 12. For example, the slip rate is calculated as follows. First, a difference is obtained by subtracting a value obtained by multiplying the rotational speed of the motor generator 12 by a pulley ratio from the rotational speed of the engine 10. The slip rate is obtained by dividing the difference by the rotational speed of the engine 10. The pulley ratio is a value obtained by dividing the diameter of the motor generator pulley 12*a* by the diameter of the crank pulley 10*a*. The slip rate can be said to be the degree to which the value obtained by multiplying the rotational speed of the motor generator pulley 12*a* by the pulley ratio deviates from the rotational speed of the engine 10.

According to S200, S202, and S204, the controller 34 executes a slip rate calculation process that calculates a slip rate of the belt 16 based on a rotational speed of the engine 10 and a rotational speed of the motor generator 12 while the power generation process is being executed.

The controller 34 executes the slip rate calculation process in S204. The controller 34 then proceeds to S206. The controller 34 determines in S206 whether the slip rate is less than a first threshold. The first threshold is predetermined in consideration of a reliability of restarting the engine 10 using the motor generator 12. When the idling stop process is executed when the slip rate is less than the first threshold, the failure of restarting the engine 10 using the motor generator 12 is sufficiently suppressed.

The controller 34 proceeds to S208 when the slip rate is less than the first threshold (S206: Yes). The controller 34 determines whether or not a second execution condition of an idling stop is satisfied in S208. The second execution condition includes a condition that the speed of the vehicle 100 is equal to or less than a second speed. The first speed is greater than the second speed. The second speed is set as a threshold value for determining that the vehicle 100 is in a state where an idling stop should be executed.

When the controller 34 makes a negative determination in S208 (S208: No), the controller 34 ends this flow. When the controller 34 makes an affirmative determination in S208 (S208: Yes), the controller 34 proceeds to S210. The controller 34 executes an idling stop process in S210 and ends this flow. Combustion in the engine 10 is stopped through the idling stop process.

According to S208 and S210, the controller 34 executes an idling stop process that stops an operation of an engine 10, when determining in the determination process that the second execution condition of the idling stop is satisfied. The determination process includes determining whether or not a second execution condition of the idling stop is satisfied without waiting, when the slip rate is less than the first threshold.

The controller 34 proceeds to S212 when the slip rate is equal to or more than or the first threshold (S206: No). The controller 34 determines in S212 whether the slip rate is less than the second threshold. The second threshold is set as a threshold value for determining that a more serious abnormality has occurred than when the belt 16 is wet with water, such as oil adhesion to the belt 16 and breakage of the belt 16. The second threshold is greater than the first threshold. The controller 34 proceeds to S216 when the slip rate is equal to or more than the second threshold (S212: No). The controller 34 prohibits the subsequent idling stop process in S216. As a result, it is possible to avoid a situation in which the engine 10 cannot be restarted using the motor generator 12 due to a more serious abnormality.

According to S212 and S216, the controller 34 prohibits the idling stop process thereafter when the slip rate is equal to or more than the second threshold larger than the first threshold. In such a case, the controller 34 stops executing the processing of FIG. 2.

The controller 34 proceeds to S214 when the slip rate is less than the second threshold (S212: Yes). The controller 34 waits in S214 from the time when the slip rate is calculated until the predetermined period elapses. The belt 16 dries over time. Thus, if the control device 34 waits until a predetermined period elapses, the slip-prone state may be resolved. The controller 34 waits in S214 for the predetermined period to elapse, and then proceeds to S208. The controller 34 then executes the processing of S208 as described above. When the controller 34 makes an affirmative determination in S208 (S208: Yes), the controller 34 proceeds to S210. The controller 34 executes the idling stop process in S210 and ends this flow.

According to S206, S208, S212, and S214, the controller 34 executes the determination process. The determination process includes determining whether or not the second execution condition of the idling stop is satisfied after waiting for the predetermined period to elapse when the slip rate is equal to or more than the first threshold.

Figure 3:
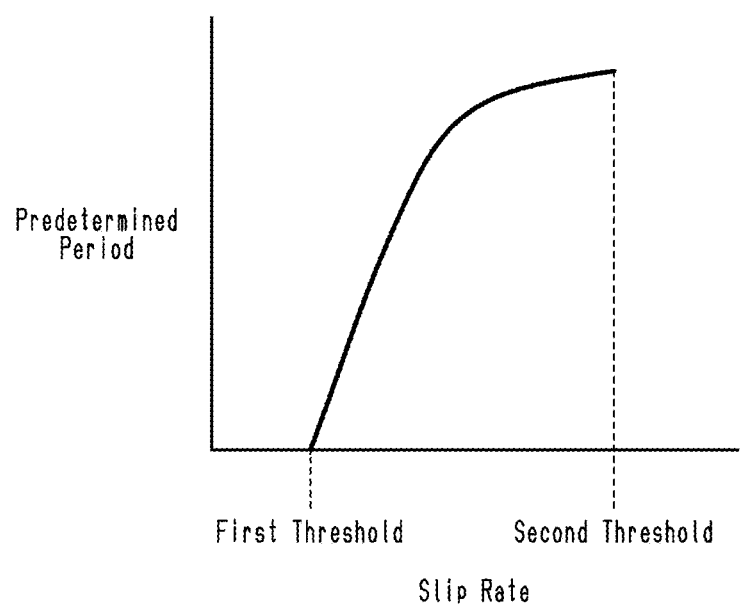
FIG. 3 is a graph showing the relationship between a slip rate and a predetermined period.

As shown in FIG. 3, the predetermined period is variably set according to the slip rate. When the slip rate is higher, the degree of wetting of the belt 16 is considered to be greater. In this case, it takes a long time for the belt 16 to dry and the slip rate to become sufficiently small. In consideration of this point, the predetermined period is variably set according to the slip rate. As shown in FIG. 3, the predetermined period increases smoothly as the slip rate increases from the first threshold to the second threshold. In such manner, the controller 34 set the predetermined period to a larger value when the slip rate is higher.

Operation of First Embodiment

When the vehicle 100 crosses a river and the belt 16 gets wet, or the belt 16 gets wet with rainwater, the belt 16 may slip easily. When the slip of the belt 16 is large, restarting the engine 10 by the motor generator 12 via the belt 16 becomes difficult. Thus, when the slip of the belt 16 is large, prohibiting the idling stop process is conceivable. As a result, it is possible to avoid a situation where it is apparent that the engine 10 cannot be restarted by using the motor generator 12.

However, as the belt 16 dries over time, the slip-prone condition disappears. In this way, the slip of the belt 16 may be temporary. Accordingly, if the prohibition of the idling stop process continues even though the belt 16 is dried and the slip of the belt 16 is eliminated, the fuel consumption is deteriorated.

Also, it is undesirable to prohibit the idling stop process even though the slip of the belt 16 is temporary. For example, the user may need to have the vehicle 100 inspected by a dealer, even though the slip of the belt 16 has been eliminated. This puts a heavy burden on the user.

In contrast to the configuration in which the idling stop process is completely prohibited when the slip of the belt 16 is large, the controller 34 according to the first embodiment executes the above-described process.

That is, the controller 34 anticipates a situation in which the idling stop process should be executed based on the first execution condition of the idling stop being satisfied (S200: Yes). The controller 34 then waits for the predetermined period to elapse when the slip rate calculated through the slip rate calculation process is equal to or more than the first threshold and less than the second threshold (S206: No, S212: Yes, S214). The controller 34 then executes the idling stop process when the second execution condition of the idling stop is satisfied (S208: Yes, S210). As described above, by waiting until the predetermined period elapses, the slip-prone condition may be eliminated. Therefore, the controller 34 can execute the idling stop process after waiting for the predetermined period to elapse, even if the slip of the belt 16 is large.

Effect of First Embodiment (1) The chances of executing the idling stop can be increased as compared with the configuration in which the subsequent idling stop is completely prohibited, when the slip rate is equal to or more than the first threshold. As a result, deterioration of fuel efficiency can be suppressed.

(2) When the slip rate is higher, the degree of wetting of the belt 16 is considered to be greater. In this case, it takes a long time for the belt 16 to dry and the slip rate to become sufficiently small. The controller 34 sets the predetermined period to a larger value when the slip rate is higher. This allows the predetermined period to be set more appropriately.

(3) The second threshold value is set as a threshold value for determining that a more serious abnormality has occurred than when the belt 16 is wet with water, such as oil adhesion to the belt 16 and breakage of the belt 16. When the slip rate is equal to or more than the second threshold, it is considered that the slip of the belt 16 is not temporary. In such a case, the controller 34 prohibits the subsequent idling stop process. As a result, it is possible to avoid a situation in which the engine 10 cannot be restarted using the motor generator 12 due to a more serious abnormality.

(4) The second speed is set as a threshold for determining that the idling stop should be executed. In addition, the first speed is set as a threshold greater than the second speed. Assume a situation where the speed of the vehicle 100 continues to decrease and the vehicle 100 stops. When the speed of the vehicle 100 is equal to or less than first speed, the power generation process is started to generate the slip required to calculate the slip rate. Thus, the power generation process is started earlier than the configuration in which the power generation process is started when the speed of the vehicle 100 is equal to or less than the second speed. Accordingly, the slip rate calculation process can be completed early and the idling stop process can be executed early. As a result, fuel efficiency can be improved compared to the configuration in which the power generation process is started when the speed of the vehicle 100 is equal to or less than the second speed.

Second Embodiment

<Process Executed by Controller>

Figure 4:
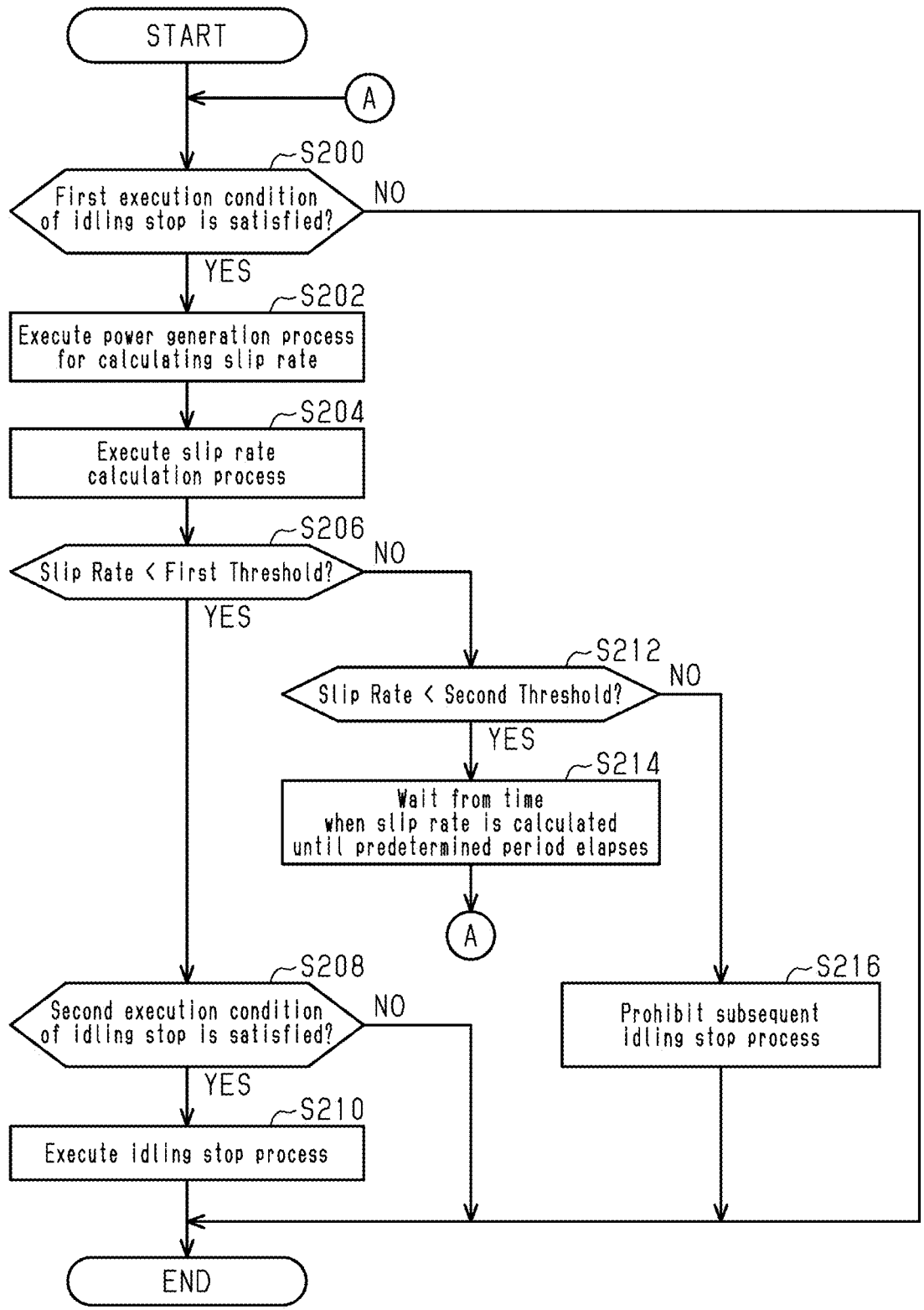
FIG. 4 is a flowchart of processing executed by the controller according to a second embodiment.

A process executed by the controller 34 according to the second embodiment will be described with reference to FIG. 4. The controller 34 according to the first embodiment proceeds to S208 after executing the process of S214. On the other hand, the controller 34 according to the second embodiment proceeds to S200 after executing the process of S214. Except for this point, the controller 34 according to the second embodiment executes the same processing as the controller 34 according to the first embodiment.

According to S200, S202, S204, S206, S212, and S214, the controller 34 executes a repeat process that repeats the power generation process and the slip rate calculation process after waiting until a predetermined period elapses, when the slip rate is equal to or more than a first threshold.

According to S206 and S208, the controller 34 executes the determination process that determines whether or not a second execution condition of the idling stop is satisfied without waiting, when the slip rate is less than the first threshold.

Effect of Second Embodiment (5) When the slip rate is equal to or more than the first threshold, the controller 34 waits until the predetermined period elapses. The drying of the belt 16 through waiting may eliminate the slip-prone condition. The controller 34 repeats the power generation process and the slip rate calculation process after waiting until the predetermined period elapses. If the recalculated slip rate is less than the first threshold, the slip-prone condition has been resolved. In such a case, the controller 34 determines whether or not the second execution condition of the idling stop is satisfied.

The controller 34 executes the idling stop process when the second execution condition of the idling stop is satisfied.

Therefore, chances of executing the idling stop can be increased as compared with the configuration in which the subsequent idling stop is completely prohibited, when the slip rate is equal to or higher than the first threshold. As a result, deterioration of fuel efficiency can be suppressed. In addition, the controller 34 performs the idling stop process only if the slip rate is less than the first threshold. That is, the idling stop process is executed after confirming that the belt 16 is in a state where it is difficult to slip. Accordingly, a restart of the engine 10 using the motor generator 12 after the idling stop is less likely to fail.

Modified Example

In addition, the following elements can be changed in each of the above embodiments. The following modified examples can be implemented in combination with each other within a technically consistent range.

In the first and second embodiments described above, the controller 34 is mounted on the vehicle 100. However, for example, a server outside of the vehicle 100 may perform at least some of the processing performed by the controller 34. In such cases, the controller 34 is capable of communicating with the external server. In this case, the controller 34 and the server work together to control the hybrid system. That is, in this case, the controller of the hybrid system is composed of controller 34 and the server.

In the first and second embodiments described above, the first execution condition of the idling stop includes a condition that a speed of the vehicle 100 on which the hybrid system is mounted is equal to or less than a first speed. Further, the second execution condition of the idling stop includes a condition that the speed of the vehicle 100 is equal to or less than a second speed. Further, the first speed is greater than the second speed. However, these are merely examples. The first execution condition and the second execution condition can be changed as appropriate. For example, the first speed may be equal to the second speed. For example, the first execution condition may include a condition that the amount of depression of the gas pedal is equal to or less than a predetermined amount. For example, the second execution condition may include a condition that the brake pedal is pressed.

In the first and second embodiments described above, the controller 34 determines in S212 whether the slip rate is less than the second threshold. Further, the controller 34 proceeds to S216 when the slip rate is equal to or more than the second threshold. Further, the controller 34 prohibits the subsequent idling stop process in S216. However, these are merely examples. For example, S212 and S216 may be omitted.

In the first and second embodiments described above, the predetermined period increases smoothly as the slip rate increases. However, the predetermined period may be switched stepwise depending on the slip rate.

In the first and second embodiments described above, the controller 34 sets the predetermined period to a larger value when the slip rate is higher. However, this is merely an example. For example, the predetermined period may be a fixed value.

In the first and second embodiments described above, there is no clutch that can connect or disconnect the engine 10 and the crank pulley 10a. However, such a clutch may be provided between the engine 10 and the crank pulley 10a.

In the first and second embodiments described above, the controller 34 has a CPU, ROM, and RAM to execute software processing. However, this is merely an example. For example, the controller 34 may include a dedicated hardware circuit (e.g., ASIC, etc.) that processes at least a portion of the software processing performed in the embodiments. That is, the controller 34 may have any of the following configurations (a) to (c). (a) The controller 34 includes a processing device that executes all processing according to the program, and a program storage device such as a ROM that stores the program. That is, the controller 34 includes a software execution device. (b) The controller 34 includes a processing device that executes a part of the processing according to the program and a program storage device. In addition, the controller 34 has dedicated hardware circuitry to perform the rest of the processing. (c) The controller 34 includes a dedicated hardware circuit that executes all processing. Here, there may be a plurality of software execution devices and/or dedicated hardware circuits. That is, the above processing can be performed by processing circuitry including at least one of a software execution device or a dedicated hardware circuit. There may be a plurality of software execution devices and dedicated hardware circuits included in the processing circuitry. A program storage device, or computer-readable medium, includes any available medium accessible by a general purpose or dedicated computer.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A controller of a hybrid system including an internal combustion engine and a motor generator connected to each other via a belt, the controller comprising: processing circuitry configured to execute:
   a power generation process that applies a load to the internal combustion engine by controlling the motor generator to generate power in response to a first execution condition of an idling stop being satisfied;
   a slip rate calculation process that calculates a slip rate of the belt based on a rotational speed of the internal combustion engine and a rotational speed of the motor generator while the power generation process is being executed;
   a determination process
      that determines, in response to the slip rate being equal to or more than a threshold, whether or not a second execution condition of the idling stop is satisfied after waiting until a predetermined period has elapsed, and
      that determines, in response to the slip rate being less than a threshold, whether or not the second execution condition of the idling stop is satisfied without waiting for the predetermined period to elapse; and
   an idling stop process that stops an operation of the internal combustion engine, in response to the determination process determining that the second execution condition of the idling stop is satisfied.

2. The controller of the hybrid system according to claim 1, wherein
   the processing circuitry is configured to set the predetermined period to a larger value when the slip rate is higher.

3. The controller of the hybrid system according to claim 1, wherein
   the threshold is a first threshold, and
   the processing circuitry is configured to prohibit the idling stop process in response to the slip rate being equal to or more than a second threshold larger than the first threshold.

4. The controller of the hybrid system according to claim 1, wherein
   the first execution condition includes a condition that a speed of a vehicle on which the hybrid system is mounted is equal to or less than a first speed,
   the second execution condition includes a condition that the speed of the vehicle is equal to or less than a second speed, and
   the first speed is greater than the second speed.

5. A controller of a hybrid system including an internal combustion engine and a motor generator connected to each other via a belt, the controller comprising: processing circuitry configured to execute:
   a power generation process that applies a load to the internal combustion engine by controlling the motor generator to generate power in response to a first execution condition of an idling stop being satisfied;
   a slip rate calculation process that calculates a slip rate of the belt based on a rotational speed of the internal combustion engine and a rotational speed of the motor generator while the power generation process is being executed;
   a repeat process that repeats, in response to the slip rate being equal to or more than a threshold, the power generation process and the slip rate calculation process after waiting until a predetermined period has elapsed;
   a determination process that determines, in response to the slip rate being less than the threshold, whether or not a second execution condition of the idling stop is satisfied without waiting for the predetermined period to elapse; and
   an idling stop process that stops an operation of the internal combustion engine, in response to the determination process determining that the second execution condition of the idling stop is satisfied.

6. The controller of the hybrid system according to claim 5, wherein
   the processing circuitry is configured to set the predetermined period to a larger value when the slip rate is higher.

7. The controller of the hybrid system according to claim 5, wherein
   the threshold is a first threshold, and
   the processing circuitry is configured to prohibit the idling stop process in response to the slip rate being equal to or more than a second threshold larger than the first threshold.

8. The controller of the hybrid system according to claim 5, wherein
the first execution condition includes a condition that a speed of a vehicle on which the hybrid system is mounted is equal to or less than a first speed,
the second execution condition includes a condition that the speed of the vehicle is equal to or less than a second speed, and
the first speed is greater than the second speed.

9. The controller of the hybrid system according to claim 8, wherein
the processing circuitry is configured to set the predetermined period to a larger value when the slip rate is higher.

10. The controller of the hybrid system according to claim 9, wherein
the threshold is a first threshold, and
the processing circuitry is configured to prohibit the idling stop process in response to the slip rate being equal to or more than a second threshold larger than the first threshold.

11. The controller of the hybrid system according to claim 4, wherein
the processing circuitry is configured to set the predetermined period to a larger value when the slip rate is higher.

12. The controller of the hybrid system according to claim 11, wherein
the threshold is a first threshold, and
the processing circuitry is configured to prohibit the idling stop process in response to the slip rate being equal to or more than a second threshold larger than the first threshold.

* * * * *